US012318931B2

(12) United States Patent
Dai et al.

(10) Patent No.: US 12,318,931 B2
(45) Date of Patent: Jun. 3, 2025

(54) ROBOT APPLICATION DEVELOPMENT SYSTEM

(71) Applicant: ABB Schweiz AG, Baden (CH)

(72) Inventors: Fan Dai, Zwingenberg (DE); Nuo Li, Mannheim (DE); Sebastian Breisch, Neckarsteinach (DE); Debora Clever, Zwingenberg (DE)

(73) Assignee: ABB Schweiz AG, Baden (CH)

( * ) Notice: Subject to any disclaimer, the term of this patent is extended or adjusted under 35 U.S.C. 154(b) by 220 days.

(21) Appl. No.: 17/992,362

(22) Filed: Nov. 22, 2022

(65) Prior Publication Data
US 2023/0083691 A1 Mar. 16, 2023

Related U.S. Application Data

(63) Continuation of application No. PCT/EP2020/064453, filed on May 25, 2020.

(51) Int. Cl.
*B25J 9/16* (2006.01)
*B25J 15/08* (2006.01)

(52) U.S. Cl.
CPC .......... *B25J 9/1605* (2013.01); *B25J 9/1671* (2013.01); *B25J 15/08* (2013.01)

(58) Field of Classification Search
CPC ........ B25J 9/1605; B25J 9/1671; B25J 15/08; B25J 15/0033; B25J 19/007; G05B 2219/39409; G05B 2219/39466
See application file for complete search history.

(56) References Cited

U.S. PATENT DOCUMENTS

| 7,822,508 B2* | 10/2010 | Sugiyama | B25J 9/1641 318/568.12 |
| 10,137,574 B2* | 11/2018 | Uchiyama | B25J 9/1692 |
| 11,331,799 B1* | 5/2022 | Shafer | B25J 9/1664 |

(Continued)

FOREIGN PATENT DOCUMENTS

| CN | 101043980 A | 9/2007 |
| CN | 110733052 A | 1/2020 |

(Continued)

OTHER PUBLICATIONS

Honarpardaz et al., "Finger Design Automation for Industrial Robot Grippers: A review," *Robotics and Autonomous Systems*, 87: 104-119 (Jan. 2017).

(Continued)

*Primary Examiner* — Jason Holloway
*Assistant Examiner* — Madison B Emmett
(74) *Attorney, Agent, or Firm* — Leydig, Voit & Mayer, Ltd.

(57) ABSTRACT

A robot application development system and method includes a robot application unit that determines a robot application, which defines the industrial robot in a robot workspace. An input interface receives robot application information. An object data interface receives work piece information. A gripper finger design unit determines a gripper finger design. The robot application unit determines the robot application using the robot application information. The gripper finger design unit determines the gripper finger design using the work piece information and the robot application information.

19 Claims, 4 Drawing Sheets

(56) References Cited

U.S. PATENT DOCUMENTS

| | | | | |
|---|---|---|---|---|
| 12,117,809 | B2* | 10/2024 | Enomoto | G06F 16/24 |
| 2007/0239315 | A1* | 10/2007 | Sato | B25J 9/1612 |
| | | | | 700/245 |
| 2015/0343642 | A1* | 12/2015 | Kiyosawa | B25J 9/1697 |
| | | | | 901/47 |
| 2016/0332297 | A1* | 11/2016 | Sugaya | B25J 9/1671 |
| 2019/0291277 | A1* | 9/2019 | Oleynik | B25J 9/1669 |
| 2020/0171675 | A1* | 6/2020 | Hayashi | B25J 9/1612 |
| 2020/0398492 | A1* | 12/2020 | Corkum | B25J 15/06 |
| 2021/0114914 | A1* | 4/2021 | Aherns | C03B 17/064 |
| 2022/0032454 | A1* | 2/2022 | Yang | B25J 9/1612 |
| 2023/0278213 | A1* | 9/2023 | Koga | B25J 9/161 |
| | | | | 700/245 |
| 2023/0373083 | A1* | 11/2023 | Watanabe | B25J 9/1628 |

FOREIGN PATENT DOCUMENTS

| | | |
|---|---|---|
| DE | 102016208456 A1 | 11/2016 |
| JP | 2019-55455 A | 4/2019 |

OTHER PUBLICATIONS

Schwartz et al., "Designing Fingers in Simulation based on Imprints," *7th International Conference on Simulation and Modeling Methodologies, Technologies and Applications (SIMULTECH)*, pp. 304-313 (Jul. 2017).

Velasco et al., "Computer-Assisted Gripper and Fixture Customization Using Rapid-Prototyping Technology," *Proc. of the 1998 IEEE International Conference on Robotics and Automation*, pp. 3658-3664 (May 1998).

Wolniakowski et al., "Task and Context Sensitive Gripper Design Learning Using Dynamic Grasp Simulation," *J. of Intelligent & Robotic Systems*, 87: 15-42 (Mar. 25, 2017).

European Patent Office, International Search Report in International Patent Application No. PCT/EP2020/064453, 3 pp. (Feb. 18, 2021).

European Patent Office, Written Opinion in International Patent Application No. PCT/EP2020/064453, 14 pp. (Feb. 18, 2021).

Li, "Design and Simulation of Industrial Robot Grinding Application Based on RobotStudio," *Mechanical Engineering & Automation*, 2: 42-44 (Apr. 15, 2020).

* cited by examiner

ROBOT APPLICATION DEVELOPMENT SYSTEM

CROSS-REFERENCE TO RELATED APPLICATIONS

This patent application claims priority to International Patent Application No. PCT/EP2020/064453, filed on May 25, 2020, which is incorporated herein in its entirety by reference.

FIELD OF THE DISCLOSURE

The present disclosure relates to a robot application development system, a robot application development method, as well as a corresponding computer program.

BACKGROUND OF THE INVENTION

For robot application with industrial robots, a gripper finger of the industrial robot defines an important part of the application. Today, gripper finger design, in particular CAD-based gripper finger design is done almost separately from the robot application development process by a CAD engineer with CAD systems he gets used to. Simple web-tools are known, where people can upload CAD model of the work piece, select a gripper type, configure the positions and sized and the tool generates STL files of 3D printing of the gripper fingers. All these steps are separated from the robot application development process or tool environment. A robot application engineer has no appropriate tool support. He must gain knowledge of CAD system and of finger design or relay on external services. In any case, the gripper finger design is performed manually.

BRIEF SUMMARY OF THE INVENTION

In one general aspect, the present disclosure is directed to an improved robot application development system. In one embodiment, a robot application development system, comprises a robot application unit, configured for determining a robot application for an industrial robot processing a work piece, wherein the robot application defines the industrial robot in a robot workspace, an input interface, configured for receiving robot application information characterizing the robot application, an object data interface, configured for receiving work piece information characterizing the work piece, and a gripper finger design unit, configured for determining a gripper finger design of a gripper finger of the industrial robot. The robot application unit is configured for determining the robot application, using the robot application information. The gripper finger design unit is configured for determining the gripper finger design, using the work piece information and the robot application information.

The term "gripper finger design," as used herein, comprises a shape of the gripper finger. In other words, the gripper finger design comprises a shape of openings in the gripper finger and/or a position of the openings in the gripper finger.

BRIEF DESCRIPTION OF THE SEVERAL VIEWS OF THE DRAWINGS

The reference symbols used in the drawings, and their meanings, are listed in summary form in the list of reference symbols. In principle, identical parts are provided with the same reference symbols in the figures.

DETAILED DESCRIPTION OF THE INVENTION

Figure 1:
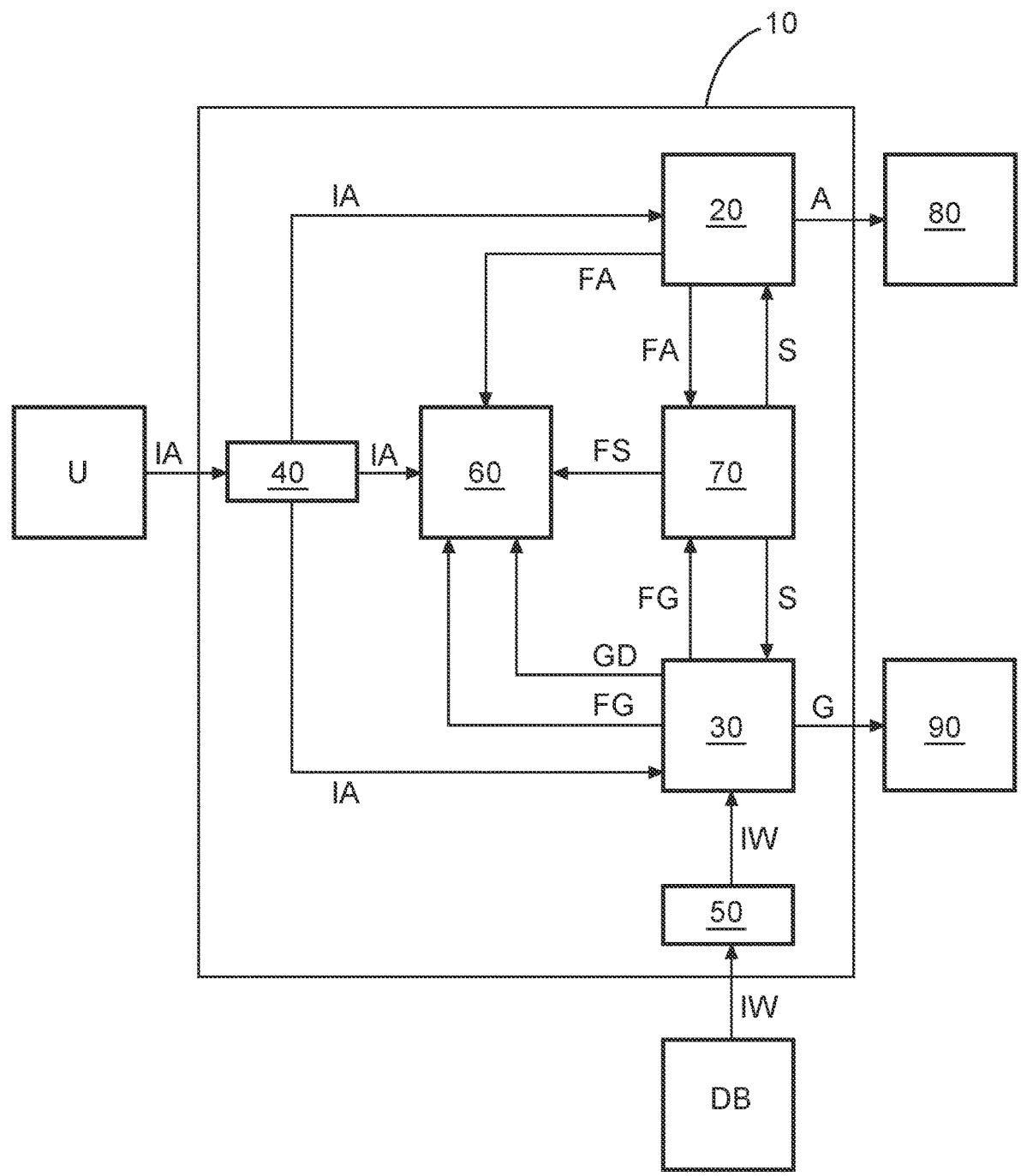
FIG. 1 is a block diagram of a robot application development system in accordance with the disclosure.

FIG. 1 shows a schematic view of a robot application development system 10. The robot application development system 10 comprises a robot application unit 20, a gripper finger design unit 30, an input interface 40, an object data interface 50, a 3D view unit 60 and a simulation unit 70.

The robot application development system 10 in this case is a robot application development software, which is used by a user U to develop a robot application A. The robot application A comprises a configuration of an industrial robot processing a work piece in a robot workspace. A physical or simulated implementation of the robot application A is referred to as robot system 80. The robot application development system 10 is also used by the user U to design a gripper finger design G for a gripper finger of the industrial robot, used in the robot application A. Consequently, the gripper finger design G is used to build a fitting gripper finger for the industrial robot in the specific robot application A. In this case, the gripper finger is 3D printed by a 3D printing unit 90 based on the gripper finger design G determined by the robot application development system 10.

The input interface 40 is configured for receiving robot application information IA from the user U. The robot application information IA comprises all necessary data of the robot application A that should be performed by the robot system 80. For example, the robot application information IA comprises information about an end product, the work piece is processed to by the industrial robot. In addition, the robot application information IA comprises an amount of industrial robots used in the robot system 80, as well as a general work space layout and the movement and orientation of the industrial robots. The robot application information IA is provided to the robot application unit 20 and the gripper finger design unit 30.

The object data interface 50 is configured for receiving work piece information IW. The work piece information IW comprises CAD data of the work piece and is provided by a CAD database DB. The work piece information IW is provided to the gripper finger design unit 30.

The robot application unit 20 is configured for determining the robot application A based on the provided robot application information IA. The gripper finger design unit 30 is configured for determining a gripper finger design G based on the provided robot application information IA and the provided work piece information IW. Consequently, the gripper finger design unit 30 is able to determine the gripper finger design G not only based on the work piece information IW but also considers additional boundaries set out by the robot application A itself. This might include a special direction, in which the gripper finger has to move, an accessibility of the work piece during the robot application, obstacles that are positioned in an obvious movement path of the industrial robot or the gripper finger. For example, the task of the industrial robot itself is also considered, for example, if the work piece has to be swept into an indentation or pressed into an indentation.

In this embodiment, the user U can input his robot application information IA directly into the 3D view unit 60, for example, by a mouse input or a keyboard input. The 3D view unit 60 provides a 3D view of the robot workspace, showing all objects involved in the robot application A. This includes the industrial robot with its gripper finger and the work piece that the industrial robot processes. In addition, this includes any kind of obstacle. The 3D view unit 60 is provided by robot application functions FA from the robot application unit 20 and by gripper finger functions FG from the gripper finger design unit 30.

Thus, a 3D view of the robot application A and the gripper finger design G can be provided by the 3D view unit 60 for the user U. In a first step, based on the robot application information IA and the work piece information IW, the gripper finger design unit 30 automatically provides a default gripper finger design GD.

The user U then has the possibilities of adjusting the gripper finger design G dependent on the provided 3D view of the robot application A. For example, the gripper finger design unit 30 provides a plurality of possible grasping positions and/or grasping orientations to the user that are all in line with the provided robot application information IA. The user U then can chose one of the provided possibilities or even amend the gripper finger design G.

In addition, the simulation unit 70 is also provided with the robot application functions FA and the gripper finger design functions FG and provides its simulation functions FS to the 3D view unit 60. By this, the user U is able to watch a simulation of at least parts of the robot application, or in other words, the processing of the work piece, and base his actions on the simulation functions FS. The simulation unit 70, in other words, runs a simulated test run of the robot application A with the presently proposed gripper finger G or in a first step with the default gripper finger GD. The simulation results S are then provided back to the robot application unit 20 and/or the gripper finger design unit 30. The simulation results S may comprise information about possible collisions of the industrial robot or the gripper finger, as well as problems in the gripping process like shifting of the work piece during the gripping process.

If the user is satisfied with the robot application A and the gripper finger design G, the gripper finger design G is provided to a 3D printing unit 90 for printing the gripper finger and the robot application A is provided to a robot system 80, implementing the robot application A.

Consequently, the robot application development system 10 provides an improved robot application A with an improved gripper finger design G.

In one embodiment, the robot application development system is implemented as programmed software modules or procedures, respectively; however, one skilled in the art will understand that the robot application development system can be implemented fully or partially in hardware.

Figure 2:
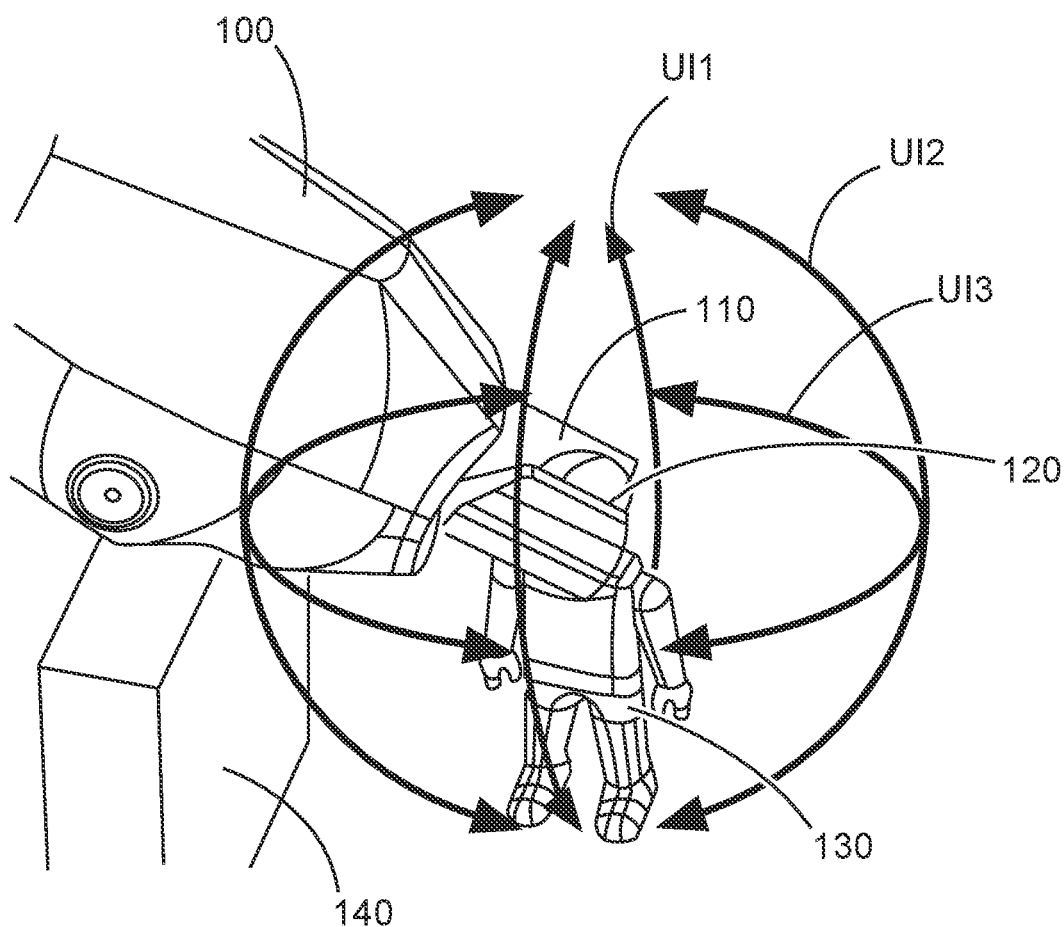
FIG. 2 is a partial outline view of a gripper finger holding a work piece shown by a 3D view unit, in accordance with the disclosure.

FIG. 2 schematically shows a gripper finger 110 of an industrial robot 100 holding a work piece 120 shown by the 3D view unit 60. In this case, the work piece 120 is a first work piece 120 being a head of a figure. The head should be insert into the body of the figure, which in this case is a second work piece 130. The robot application information IA comprised the information that in the robot application A an obstacle 140 in form of a cube will be present due to the production process. Consequently, in order to avoid a collision of the industrial robot 100 with the obstacle 140, a grasping position must also consider the insertion motion, in this case from top downwards. In other words, any indentation or opening of the gripper finger 110, which is used for grasping the first work piece 130 needs to consider this special circumstance. In this case, the indentation of the gripper finger 110 for holding the work piece 120 might need a steeper shape due to the direction of the grasp, compared to a scenario without the obstacle 140.

The 3D view unit 60 also comprises a user interface UI for the user U to directly adjust the grasping position as well as any other property of the gripper finger 110, like length or size of the fingers of the gripper finger 110. In this case, the user interface UI allows the user U to change the angel of grasping of the gripper finger 110 in three dimension, marked by the first angle regulator UI1, the second angel regulator UI2 and the third angle regulator UI3.

The gripper finger 110, shown in the 3D view, in this case, has been automatically determined by a default gripper finger design GD based on the provided robot application information IA and the provided work piece information IW. The user consequently only has to provide slight amendments to the gripper finger 110, if any amendments are necessary at all.

Figure 3:
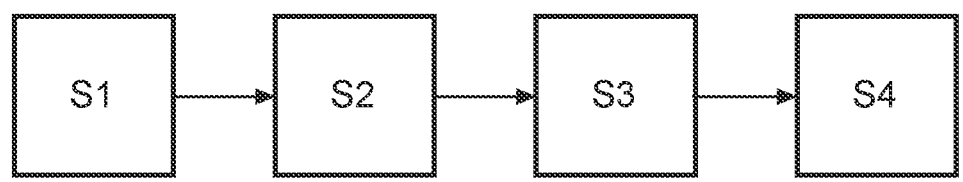
FIG. 3 is a flowchart for a robot application development method in accordance with the disclosure.

FIG. 3 schematically shows a robot application development method comprising the following steps. In a first step S1, robot application information characterizing the robot application is received. In a second step S2, work piece information characterizing the work piece is received. In a third step, a robot application for an industrial robot processing a work piece is determined, wherein the robot application defines the industrial robot in a robot workspace. In a fourth step, a gripper finger design of a gripper finger of the industrial robot is determined, wherein the robot application is determined using the robot application information and wherein the gripper finger design is determined using the work piece information and the robot application information.

Figure 4A:
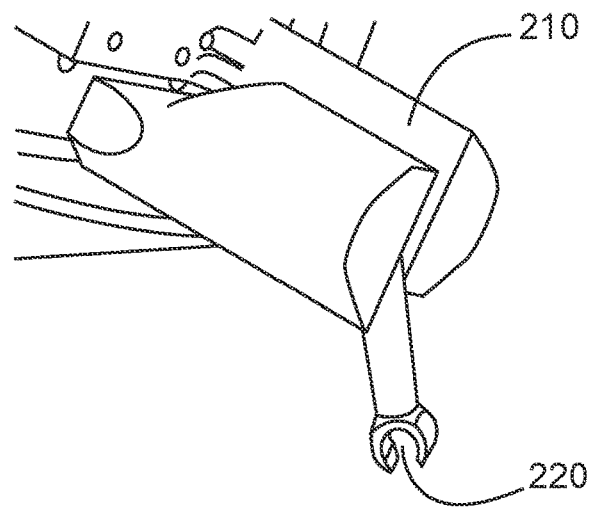
FIG. 4a is a partial perspective view of a gripper finger holding a first work piece in accordance with the disclosure.
Figure 4B:
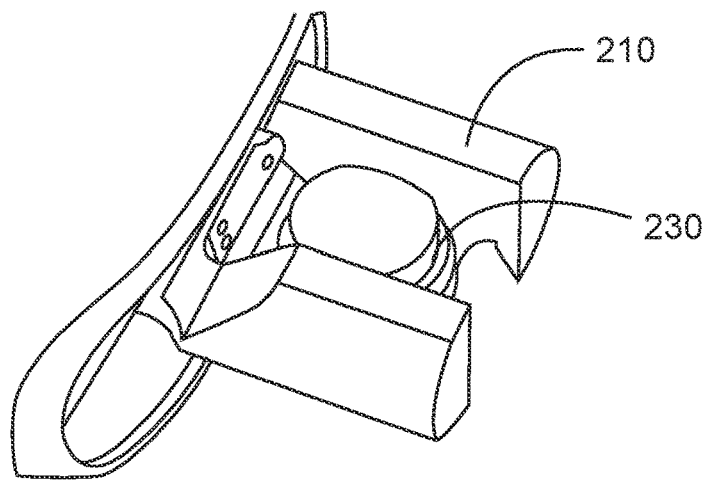
FIG. 4b is a partial perspective view of a gripper finger holding a second work piece in accordance with the disclosure.
Figure 4C:
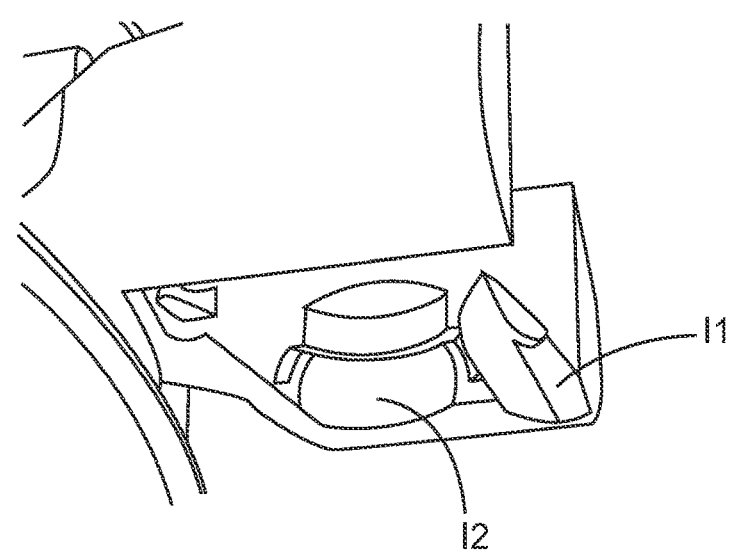
FIG. 4c is a partial perspective view of a gripper finger in accordance with the disclosure.
Figure 5A:
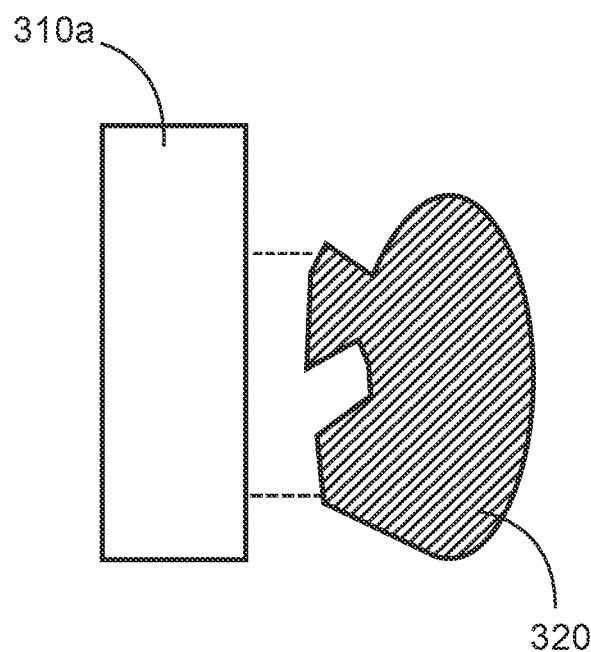
FIG. 5a is a detail schematic view of a gripper finger blank and a work piece in accordance with the disclosure.
Figure 5B:
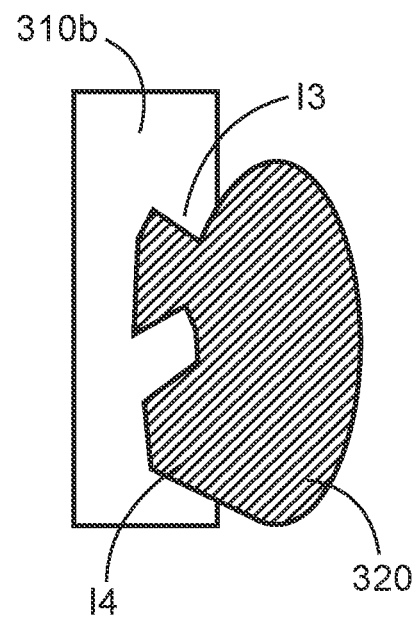
FIG. 5b is a detail schematic view of a gripper finger in position of a work piece in accordance with the disclosure.
Figure 5C:
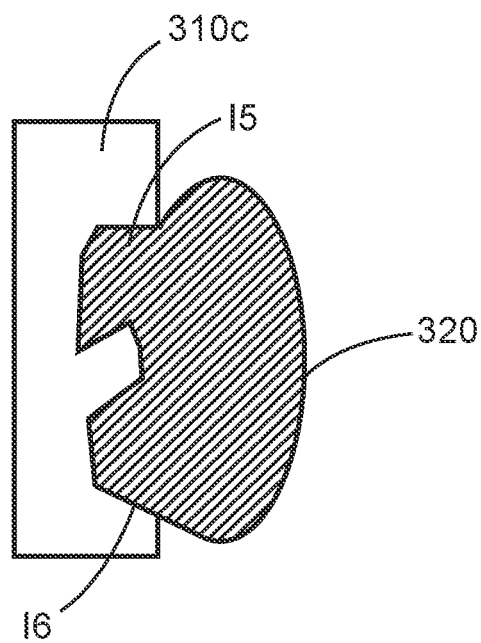
FIG. 5c is a detail schematic view of a gripper finger with a swept intersecting portion in accordance with the disclosure.
Figure 5D:
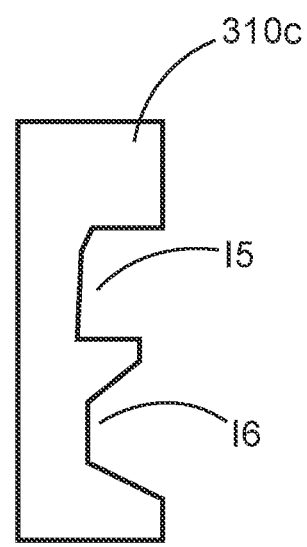
FIG. 5d is a detail schematic view of a final gripper finger in accordance with the disclosure.

FIGS. 4a-4c show a perspective view of a gripper finger 210 of another embodiment, capable of holding a third work piece 220 and a fourth work piece 230. The gripper finger design unit 30 that provided the gripper finger design G was able to provide the gripper finger 210 with a first indentation I1 and a second indentation I2, wherein the first indentation I1 is used for grasping the fourth work piece 230 and the second indentation I2 is used for grasping the third work piece 220.

It can be seen in FIG. 4c that the first indentation I1 includes an unusual angle for holding the third work piece 220. However, due to the combined robot application information IA and the work piece information IW, the gripper finger design unit 30 was able to provide the depicted gripper finger design.

FIGS. 5a-5d show a schematic view of generating a geometry of the gripper finger design. A gripper finger blank 310a is set near a fifth work piece 320. The gripper finger design unit 30 determines a depth of grasping the fifth work piece 320 and overlaps the gripper finger blank 310a with the fifth work piece 230. Overlapping portions are determined to be openings. In this case, the openings are determined as third indentation I3 and fourth indentation I4. This leads to an intermediate gripper finger 310b. However, due to a known direction of grasping, the gripper finger design unit 30 artificially increases the shape of the fifth work piece 320 at the indentations, considering the grasping direction. Consequently, a fifth indentation I5 and a sixth indentation I6 is determined, finalizing the gripper finger design 310c for the specific robot application A. In this case, two gripper finger designs are integrated in one single gripper finger design. Thus, changing the gripper finger during the robot application can be avoided.

In addition, the gripper finger design unit 30 is configured for optionally enlarging the cut volume for the indentations to consider tolerances, which are preferably provided by the robot application information. Additionally, the gripper finger design unit 30 is preferably configured for smoothing or chamfering the edges of the gripper finger design 310c based on the robot application information. In a final step, the gripper finger design unit 30 is preferably configured for cutting unnecessary areas from the gripper finger design 310c to minimize a size and weight of the gripper finger design 310c.

It is pointed out that compared to described relatively simple method for sweep cutting, because the gripper finger design unit 30 is provided with the robot application information, the gripper finger design unit 30 is able to consider more complex sweep paths.

Processing the work piece may comprise assembly of a work piece from a plurality of work piece parts. This preferably includes sticking, screwing, pressing and the like.

The gripper finger design unit may be configured for automatically determining the gripper finger design using the work piece information and the robot application information. Further preferably, the gripper finger design unit is configured for at least partially automatically determining the gripper finger design.

The robot application unit can also provide robot application design functions, allowing a user to load or create 3D models of work pieces and the industrial robot.

The work piece information may comprise a description of the work piece, a product structure, in case the work piece has to be assembled, an object type information, in particular a screw of a registered jack, additional design features, which a mechanic engineer uses to design the work piece, in particular alignment axis or planes, and/or manufacturing information, in particular a weight of the work piece or a force to be applied to the work piece.

The gripper finger design unit may also determine the gripper finger design considering a secure grasp of the work piece, a minimal weight of the gripper finger and/or a minimal foot print of the gripper finger.

A user may use the robot application, or a robot application software, to execute the desired operations of the robot. Furthermore, the determined robot application can be a virtual robot application, in other words a simulated robot application, or a real robot application.

The gripper finger design unit may be configured for integrating a plurality of gripper finger designs in one single gripper finger design based on the provided robot application information and the work piece information. In other words, the gripper finger design unit is configured for locally clustering tasks, even if different types of gripper finger designs are necessary. When the gripper finger design unit is able to integrate two or more gripper finger designs in one gripper finger design, and thus in one gripper finger, changing the gripper finger during the robot application can be avoided.

Thus, the gripper finger design is integrated into a robot application development environment, in particular the described robot application development system. Consequently, direct support is provided to a robot application engineer to design the gripper finger based on the robot application. Furthermore, a possibility for seamlessly adjusting the gripper finger design and the robot application as a whole.

In addition, the gripper finger design and the robot application can be adjusted automatically by the robot application design system, or manually by the user or semi-automatically by the robot application design system and the user, as a whole.

Thus, an improve robot application development system is provided. In one embodiment, the robot application information comprises a robot workspace layout, at least one action of the industrial robot, a movement of the industrial robot.

In other words, the robot application information contains information about a type of action of the industrial robot, or in particular the gripper finger. For example, the robot application information defines if a work piece, or a part of the work piece, is swept or pressed or twisted or screwed during the robot application.

The robot application unit may be configured that the robot application information is defined or adjusted by a user.

In other words, the gripper finger design unit is configured for at least partially automatically determining the gripper finger design considering the robot workspace layout, at least one action of the industrial robot and a movement of the industrial robot. In other words, the gripper finger design unit is configured for considering any obstacles in the robot workspace that might lead to a collision with the gripper finger during robot application. Thus, an improve robot application development system is provided.

In one embodiment, the gripper finger design comprises at least one opening for grasping, a grasping position and/or a grasping orientation. Consequently, the gripper finger design comprises openings, or in other words indentations, in shape orientation and amount tailored to the robot application. Thus, an improve robot application development system is provided.

In another embodiment, the gripper finger design unit is configured for automatically determining a default gripper finger design, using the work piece information and the robot application information.

The default gripper finger design relates to gripper finger design that is automatically determined by the gripper finger design unit and presented to the user as a default option instead of a generic gripper finger design that has not yet a connection to the robot application.

The gripper finger design unit may be configured for automatically determining a default grasping position and/or a default grasping orientation. The gripper finger design unit may be configured for adjusting the grasping position and/or the grasping orientation based on the default grasping position and user input. Thus, an improve robot application development system is provided.

In yet another embodiment, the gripper finger design unit may be configured for automatically determining a plurality of possible grasping positions and/or grasping orientations. In other words, the gripper finger design unit considers the provided work piece information and the robot application information to suggest possible grasping positions and/or grasping orientations to the user. Thus, an improve robot application development system is provided.

In yet another embodiment, the work piece information comprises geometry information of the work piece. The input interface may be configured for inputting the robot application information by a user.

The input interface may allow a user to load 3D models of the objects involved, in other words the at least one work piece, obstacles, industrial robots, in the robot application from the CAD database into the robot application development system. Thus, an improve robot application development system is provided.

In one embodiment, the gripper finger design unit is configured for generating CAD data of the work piece for 3D printing of the gripper finger based on the gripper finger design. Preferably, the gripper finger design unit is configured for directly exporting the CAD for 3D printing the gripper finger. Alternatively, the gripper finger design unit is configured for storing the CAD data for later use. The CAD data may comprise a STL file for 3D printing. Thus, an improve robot application development system is provided.

In one embodiment, the object data interface is configured for receiving the work piece information from a CAD database. The object data interface is configured for receiving the work piece information from the CAD database by loading the work piece information by a user.

In another embodiment, the robot application development system comprises a simulation unit, configured for providing simulation functions of the robot application. The simulation functions may be configured for test running the robot application, in particular in view of the gripper finger design and the robot application information. In other words, the simulation functions may be integrated into the robot application development system.

Consequently, optimization of the developed robot application including the gripper finger design is provided by integrated simulation capabilities avoiding extensive data exchange between CAD and robot simulation software.

The simulation unit is preferably configured for simulating the robot application with the at least partially automatically determined gripper finger design. After an adjustment of the gripper finger design by the user, the simulation unit is configured to rerun the simulation of the robot application with the adjusted gripper finger design.

In another embodiment, the input interface comprises a user interface configured for user interaction. The user interface preferably comprises 2D user interface elements. In a preferred variant of the invention, the robot application development system comprises a 3D view unit, providing at least one 3D view of the robot workspace layout, wherein the robot workspace layout comprises the industrial robot and the work piece involved in the robot application.

The 3D view unit thus provides at least one 3D view of the automatically determined gripper finger design, which the user then can fine-tune manually.

Consequently, most of the gripper finger design work already is automated before the user manually designs the gripper finger design. Thus, an improve robot application development system is provided.

In another embodiment, the input interface is configured for allowing the user to directly manipulate the 3D view of the robot workspace layout. Thus, an improve robot application development system is provided.

The input interface may be configured for allowing the user to directly manipulate the gripper finger design, in particular adjusting the grasping position and/or grasping orientation in the 3D view of the robot workspace layout. Thus, an improve robot application development system is provided.

The present disclosure also relates to a robot application development method, comprising the following steps. Receiving robot application information characterizing the robot application. Receiving work piece information characterizing a work piece. Determining a robot application for an industrial robot processing the work piece, wherein the robot application defines the industrial robot in a robot workspace. Determining a gripper finger design of a gripper finger of the industrial robot. The robot application is determined using the robot application information. The gripper finger design is determined using the work piece information and the robot application information.

The robot application development method may be a computer-implemented method. The present disclosure also relates to a computer program that when it is executed on a robot application development system, as described herein, instructs the robot application development system to execute steps of a robot application development method, as described herein.

LIST OF REFERENCE SYMBOLS 10 robot application development system
20 robot application unit
30 gripper finger design unit
40 input interface
50 object data interface
60 3D view unit
70 simulation unit
80 robot system
90 3D printing unit
100 industrial robot
110 gripper finger
120 first work piece
130 second work piece
140 obstacle
210 gripper finger
220 third work piece
230 fourth work piece
310a gripper finger blank
310b intermediate gripper finger
310c gripper finger design
320 fifth work piece
330 sixth work piece
I1 first indentation
I2 second indentation
I3 third indentation
I4 fourth indentation
I5 fifth indentation
I6 sixth indentation
A robot application
G gripper finger design
GD default gripper finger design
IA robot application information
IW work piece information FA robot application functions
FG gripper finger design functions
FS simulation functions
S simulation output
U user
DB CAD database
UI user interface
UI1 first angle regulator
UI2 second angle regulator
UI3 third angle regulator
S1 first step
S2 second step
S3 third step
S4 fourth step All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A robot application development system, comprising: a controller configured to:
   determine a robot application for an industrial robot processing a work piece, wherein the robot application defines the industrial robot in a robot workspace;
   receive, by an input interface, robot application information characterizing the robot application;
   receive, by an object data interface, work piece information characterizing the work piece; and
   determine a gripper finger design of a gripper finger of the industrial robot,
   wherein the controller is configured to determine the robot application using the robot application information,
   wherein the controller is configured to determine the gripper finger design using the work piece information and the robot application information, and
   wherein the controller is configured to automatically determine a default gripper finger design using the work piece information and the robot application information.

2. The robot application development system of claim 1, wherein the robot application information comprises a robot workspace layout, at least one action of the industrial robot, and a movement of the industrial robot.

3. The robot application development system of claim 1, wherein the gripper finger design comprises at least one of an opening for grasping, a grasping position, and a grasping orientation.

4. The robot application development system of claim 1, wherein the controller is configured to automatically determine a plurality of possible grasping positions and/or grasping orientations.

5. The robot application development system of claim 1, wherein the work piece information comprises geometry information of the work piece.

6. The robot application development system of claim 1, wherein the input interface is configured for inputting the robot application information by a user.

7. The robot application development system of claim 1, wherein the controller is configured to generate Computer-Aided Design (CAD) data of the work piece for 3D printing of the gripper finger based on the gripper finger design.

8. The robot application development system of claim 1, wherein the object data interface is configured for receiving the work piece information from a Computer-Aided Design (CAD) database.

9. The robot application development system of claim 1, wherein the controller is further configured to provide simulation functions of the robot application.

10. The robot application development system of claim 1, wherein the input interface comprises a user interface configured for user interaction.

11. The robot application development system of claim 1, wherein the controller is further configured to provide at least one 3D view of the robot workspace layout, wherein the robot workspace layout comprises the industrial robot and the work piece involved in the robot application.

12. The robot application development system of claim 1, wherein the input interface is configured for allowing the user to directly manipulate the 3D view of the robot workspace layout.

13. A computer implemented method for robot application development containing computer-executable instructions stored in tangible media that, when executed by a computer, cause the following to be executed:
   receiving robot application information characterizing the robot application;

receiving work piece information characterizing a work piece;

determining a robot application for an industrial robot processing the work piece, wherein the robot application defines the industrial robot in a robot workspace;

determining a gripper finger design of a gripper finger of the industrial robot, wherein the robot application is determined using the robot application information, wherein the gripper finger design is determined using the work piece information and the robot application information, and wherein a default gripper finger design is automatically determined using the work piece information and the robot application information.

14. The robot application development method of claim 13, wherein the robot application information comprises a robot workspace layout, at least one action of the industrial robot, and a movement of the industrial robot.

15. The robot application development method of claim 13, wherein the gripper finger design comprises at least one of an opening for grasping, a grasping position, and a grasping orientation.

16. The robot application development method of claim 13, wherein the gripper finger design unit automatically determines a default gripper finger design using the work piece information and the robot application information.

17. The robot application development method of claim 13, wherein the gripper finger design unit automatically determines a plurality of possible grasping positions and/or grasping orientations.

18. The robot application development method of claim 13, wherein the work piece information comprises geometry information of the work piece.

19. The robot application development method of claim 13, wherein the gripper finger design unit generates Computer-Aided Design (CAD) data of the work piece for 3D printing of the gripper finger based on the gripper finger design.

* * * * *